United States Patent [19]

Bevil

[11] Patent Number: 5,584,602
[45] Date of Patent: Dec. 17, 1996

[54] METHOD FOR LANDSCAPE AND HARDSCAPE EDGING

[76] Inventor: John A. Bevil, 10319 Lone Brook, Houston, Tex. 77041

[21] Appl. No.: 480,683

[22] Filed: Jun. 7, 1995

Related U.S. Application Data

[63] Continuation of Ser. No. 138,139, Oct. 15, 1993, abandoned.

[51] Int. Cl.$^6$ .................................................. A01G 1/08
[52] U.S. Cl. .................................. 405/36; 47/33; 47/58; 47/1.01; 405/258
[58] Field of Search .................................. 405/284, 282, 405/283, 36, 258, 58; 47/33, 1.01, 1 F; 52/102; 404/7

[56] References Cited

U.S. PATENT DOCUMENTS

| | | | |
|---|---|---|---|
| 2,184,904 | 12/1939 | Brehme | 47/33 |
| 2,746,723 | 5/1956 | Freeman . | |
| 2,782,561 | 2/1957 | Smith . | |
| 2,794,375 | 6/1957 | Di Falco et al. . | |
| 3,933,311 | 1/1976 | Lemelson | 47/33 |
| 4,202,145 | 5/1980 | Coulter | 47/102 |
| 4,463,529 | 8/1984 | Singer et al. . | |
| 4,644,685 | 2/1987 | Tisho | 47/33 |
| 4,647,491 | 3/1987 | Ireland | 47/33 |
| 4,869,018 | 9/1989 | Scales | 47/33 |
| 4,932,157 | 6/1990 | Shimp | 47/25 |
| 4,955,156 | 9/1990 | Williams . | |
| 5,315,780 | 5/1994 | Thomas | 47/33 |

FOREIGN PATENT DOCUMENTS

| | | | |
|---|---|---|---|
| 0326797 | 1/1989 | European Pat. Off. . | |
| 263290 | 10/1989 | France | 47/33 |
| 592621 | 2/1934 | Germany | 47/83 |
| 2837126 | 2/1980 | Germany | 47/33 |
| 3607630 | 3/1987 | Germany | 405/258 |
| 399250 | 10/1933 | United Kingdom | 47/33 |

*Primary Examiner*—Henry E. Raduazo

[57] ABSTRACT

The invention is a method and apparatus for edging landscapes and hardscapes that also allows for drainage of water and other liquids from the edged areas. A strip is provided having a number of regularly spaced openings through which liquids can drain. The strip is inserted into the ground about the edge of landscapes and hardscapes. The strip is positioned with the openings at desired levels above and/or below the surface of the adjacent landscape/hardscape area appropriate to allow drainage of accumulated water. A variety of opening shapes and arrangements of openings may be utilized to facilitate drainage.

20 Claims, 3 Drawing Sheets

METHOD FOR LANDSCAPE AND HARDSCAPE EDGING

This application is a continuation of application Ser. No. 08/138,139, filed Oct. 15, 1993, and now abandoned.

TECHNICAL FIELD

This invention relates to edging of landscapes, hardscapes and other ground surfaces and, in particular, to a method and apparatus for separating such areas with an edging strip that allows drainage of liquids that might otherwise accumulate within at least one of the areas separated.

BACKGROUND AND SUMMARY OF THE INVENTION

Edging material is often used to separate two or more adjacent areas of the gardens, lawns, driveways, walkways and the like, for aesthetic as well as functional purposes. Edging material generally comprises a rectangular strip of metal, vinyl or other similar material which is embedded into the ground as a divider between two or more of such areas, sometimes to contain a built-up area such as a flower bed, separate flower beds from grass and other ground cover, and separate ground cover and flower beds from other ground surfaces, such as driveways, walkways and the like. Areas such a flower beds, lawns and other natural ground cover are generally referred to as softscapes, while structural ground cover, such as driveways, walkways and the like, is generally referred to as hardscape. Edging material may also be useful in separating and supporting other types of ground cover as well.

FIG. 1 illustrates a typical problem encountered of excessive water accumulation when using a conventional strip of edging material to separate the edges of a built-up flower bed 4 from an adjacent grassy area 6. The flower bed 4 is raised above the surrounding grass area 6 both give an appealing appearance and to facilitate drainage of water from around the root system contained within the root ball 10. Building up the flower bed 4 to facilitate drainage is particularly desirable in areas where the ground 11 underlying the bed 4 does not drain well. This is often the case when the underlying ground 11 has a high clay content or is compacted.

However, use of a conventional edging strip 2 inhibits the drainage of water 12 accumulating within the boundary of the strip 2 from precipitation 14 and sprinkler spray 16. As a result of the accumulation of water 12 trapped in the bed 4 by the edging strip 2, the effective water table 18 (shown by broken lines) is lifted by capillary action of the soil even farther upward into the bed 4 to surround almost the entire root system within the root ball 10. Water 12 trapped by the edging strip 2 remains for an extended period of time, excessively exposing the root system to water. Such exposure often causes "root rot", fungal infections and bacterial infections that can greatly deteriorate plant health over time and even kill plants in only a few days.

A similar problem results from use of conventional edging strips as a border between hardscapes and adjacent areas. Edging material is often used in this way to prevent growth of ground cover over hardscapes and to present an attractive appearance. However, edging strips extending above the surface of the hardscape area tend to trap and accumulate standing water, even if a hardscape surface is raised above the surrounding area. Thus, puddles that are unsightly and dangerous if slippery, often form on hardscape areas bounded by conventional strips of edging material.

These and other disadvantages associated with conventional edging strips are overcome by the method and apparatus of the present invention. The invention includes an edging strip having openings regularly spaced along its length to allow drainage of liquids from a flower bed or other contained area. At the same time, the edging strips provide a barrier between adjacent landscape, hardscape and other ground areas and provide support about the perimeter of flower beds and other raised landscape areas. The openings may be arranged in a variety of patterns, enhancing drainage and/or assuring that no ground cover grows through the openings into an area separated by the strip. The strips may be secured in desired locations and positions utilizing fasteners, which insert through openings of the strip and embed into an adjacent landscape, hardscape or other ground area. The strip allows both surface and subsurface drainage, depending upon the arrangement of the holes and the distance the strip is embedded into the ground. Regular placement of the holes along the strip promotes uniform drainage along the length of the strip.

Another aspect of the invention is facilitating bending and shaping of an edging strip incorporating the invention, by arranging the openings through the strip to reduce resistance of the strip to bending. This is accomplished by aligning the openings transversely across the strip to form bend lines or bending areas, in which the concentration of openings is increased to reduce bending resistance.

Yet another aspect of the invention is to facilitate drainage of standing water from hardscapes by positioning openings on the strip adjacent at least one longitudinal edge. The strip is then placed about the perimeter of the hardscape surface with that portion of the strip containing the openings positioned above the adjacent surface, thereby allowing drainage of standing water or other liquids through the strip.

BRIEF DESCRIPTION OF THE DRAWINGS

These and other features of the invention will become more apparent from the following description in which reference is made to the appended drawings, wherein.

DETAILED DESCRIPTION OF THE DRAWINGS

Figure 1:
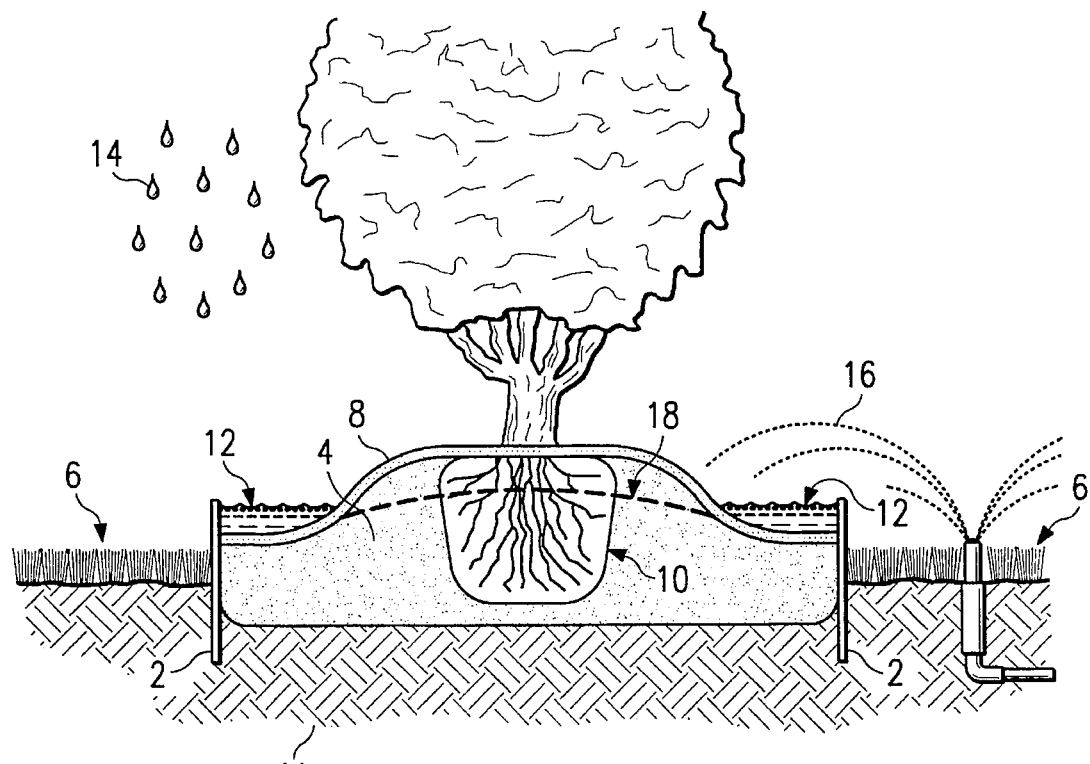
FIG. 1 is a sectional side view schematically illustrating the effect of utilizing edging strips of the prior art with landscaping.
Figure 2:
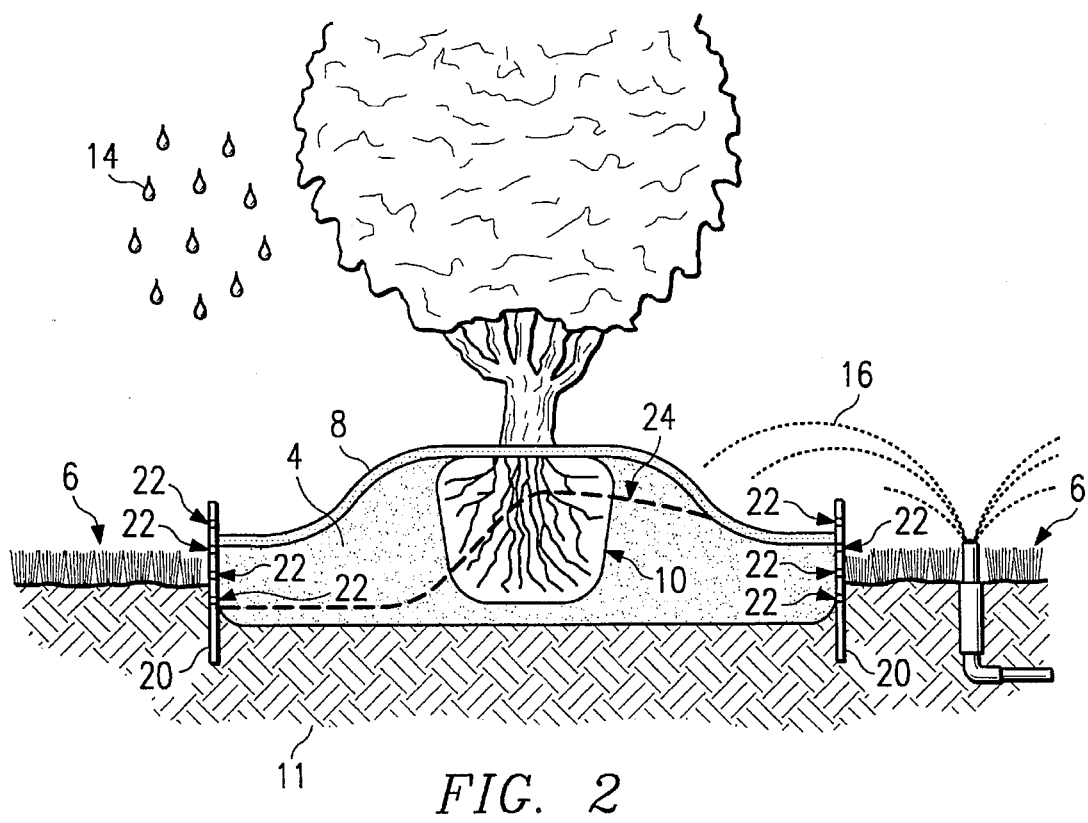
FIG. 2 is a sectional side view schematically illustrating use of edging strips of the present invention with landscaping.

FIG. 2 illustrates the advantages of use of the present invention with the flower bed 4 and its advantages over the prior art edging strip shown in FIG. 1. Aspects of FIG. 2, corresponding in structure and function to those shown in FIG. 1, are identified in FIG. 2 by the same referenced numeral.

The built-up flower bed 4 shown in FIG. 2 is surrounded by an edging strip 20, incorporating the present invention. The edging strip 20 separates the flower bed 4 from the surrounding grass area 6 and supports the perimeter of the bed at a higher level. The edging strip 20 is embedded into the earth at its lower longitudinal end, to anchor the strip against movement.

Spaced at regular intervals along the length of the strip 20 is an array of openings 22. The openings 22 provide a passage through which water or other liquids that would otherwise be retained by the strip can drain. The strip 20 is preferably manufactured from steel, steel alloy, vinyl, aluminum or other material typically used to construct conventional edging strips.

FIG. 2 illustrates the effect of the edging strip 20 on the drainage of water within the flower bed 4. Water deposited on the flower bed 4 by precipitation 14 or from sprinkler spray 16 may drain through the edging strip 20 via openings 22, both above and below the surface 8 of the flower bed 4. For example, sprinkler spray 16 deposited on the right side of the flower bed 4 does not accumulate above the surface 8 against the edging strip 20, as is the case with the prior art strip 2 shown in FIG. 1. Instead, the water deposited drains from the surface 8 of the flower bed 4, rather than accumulating. While a water line 24 tends to extend upwardly about the root ball 10 near the sprinkler spray 16 during watering, excess water is allowed to drain through the openings 22 near the sprinkler and elsewhere in the strip. Thus, the water level 24 recedes toward left side of the bed 4 and does not accumulate appreciably on the surface 8 of the bed 4. Once the sprinkler spray 16 is terminated, the water level 24 adjacent the right side of the bed 4 will similarly recede, by drainage of water through the openings 22 of the strip 20, leaving the flower bed 4 watered well, but also leaving the root ball 10 substantially out of contact with excessive standing water.

The edging strip 20 is utilized by its placement along a predetermined portion of the boundary of the flower bed 4. The strip 20 is pressed downwardly until its lower end embeds in the underlying ground 11. The strip 20 is positioned such that at least some of the openings 22 are placed above the upper surface 8 of the flower bed 4, to allow drainage of accumulating surface water. Openings 22 placed at a lower level allow drainage of accumulated water from within the bed 4 to the surrounding grass 6 and ground 11, which are disposed at a lower level than the surface 8 of the flower bed 4.

FIGS. 3A through 3G schematically illustrate construction of edging strips 30 with openings in a variety of arrangements. Each of the edging strips 30 shown in FIGS. 3A through 3G is preferably manufactured from steel, steel alloy, vinyl, aluminum, or other material generally used in the manufacture of conventional edging strips. Rectangular in shape, the strips 30 are preferably between four to six inches in height, measured between their upper and lower longitudinal edges, and are preferably 1/16 inch to 1/4 inch in thickness. The openings of each of the strips 30 are sized small enough to contain soil and mulch, yet large enough to allow easy drainage of water.

Figure 3A:
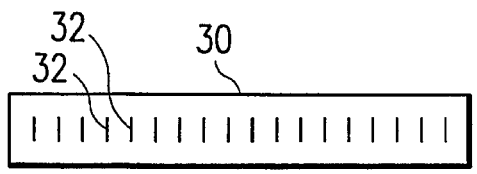
FIGS. 3A through 3G illustrate a variety of arrangements of openings through an edging strip of the present invention.

Referring to FIG. 3A, the openings of the strip 30 are arranged in a series of slots 32, extending across the centerline of the strip 30, partially between the upper and lower longitudinal edges of the strip 30.

Figure 3D:
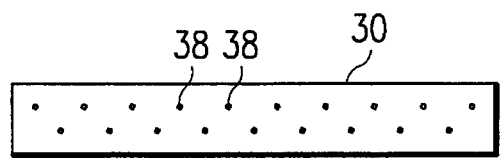
Figure 3B:
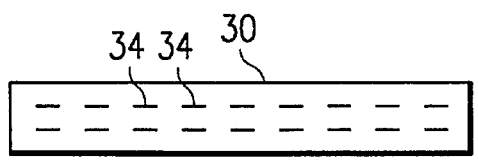

As illustrated in FIG. 3B the openings are shown as two sets of slots 34, extending longitudinally along the strip 30. The slots of each set are longitudinally aligned with each other. The two sets of slots 34 are positioned on opposite sides of the centerline of the strip 30. Spacing each set of the slots 34 away from the centerline of the strip 30 allows the strip 30 to be positioned with one set of the slots 34 below the surface of a flower bed, for example, and with the other set of the slots 34 above the surface of the bed. In use, the strip 30 of FIG. 3B may also be positioned such that adjacent ground cover, such as grass and the like, is at a level between the two sets of slots 34. In this way, grass on a surrounding area will not have the opportunity to grow through the slots 34.

Figure 3E:
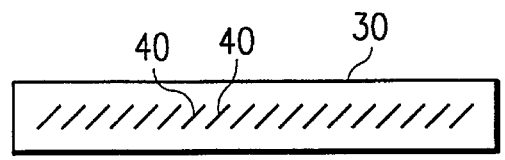
Figure 3C:
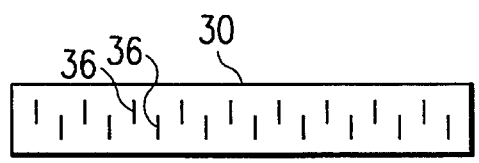

FIG. 3C illustrates use of an arrangement of slots 36 extending transversely across the strip 30. Each of the slots 36 is offset or staggered transversely from its adjacent slot, to allow drainage of water through the strip 30 through a range extending substantially across the entire width of the strip, without unduly weakening the strip 30.

FIG. 3D illustrates yet another arrangement in which the openings are formed as holes or perforations 38 through the strip 30. The holes 38 are arranged in two sets. Each set is aligned longitudinally along the strip 30. The two sets of holes 38 are positioned on opposite sides of the centerline of the strip 30 and each set is staggered or offset longitudinally from the other. Again, this arrangement allows uniform drainage of water through the strip 30, retention of strength, and provides a middle area without openings through which adjacent grass or other ground cover might grow.

Shown in FIG. 3E is a strip 30, wherein holes are formed as slots 40 extending diagonally across the centerline of the strip 30.

Figure 3F:
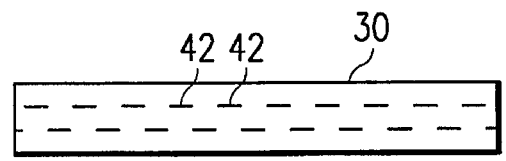

FIG. 3F illustrates a strip 30 having openings formed as two sets of longitudinally aligned slots 42. The two sets of slots 42 are each positioned on opposite sides of the centerline of the strip 30. Similarly to the strips 30 of FIGS. 3B and 3D, spacing the two sets of slots 42 apart from the centerline of the strip 30 provides a barrier blocking the growth of grass and other ground cover.

Figure 3G:
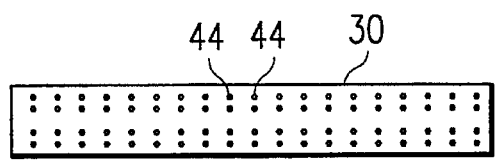

Illustrated in FIG. 3G is a strip 30, wherein the openings are formed as pairs of perforations 44. The pairs of perforations 44 are longitudinally aligned in two sets. Each set is positioned adjacent one of the two longitudinal edges of the strip 30, leaving a space along the centerline of the strip 30 to inhibit the growth of ground cover.

The strips 30 of FIGS. 3A through 3G are utilized in the manner described with reference to FIG. 2, positioning the openings of each strip at the desired level relative to adjacent landscaping, hardscaping and ground cover, to allow drainage both above and below the surfaces of the areas separated by the strips 30.

Figure 4:
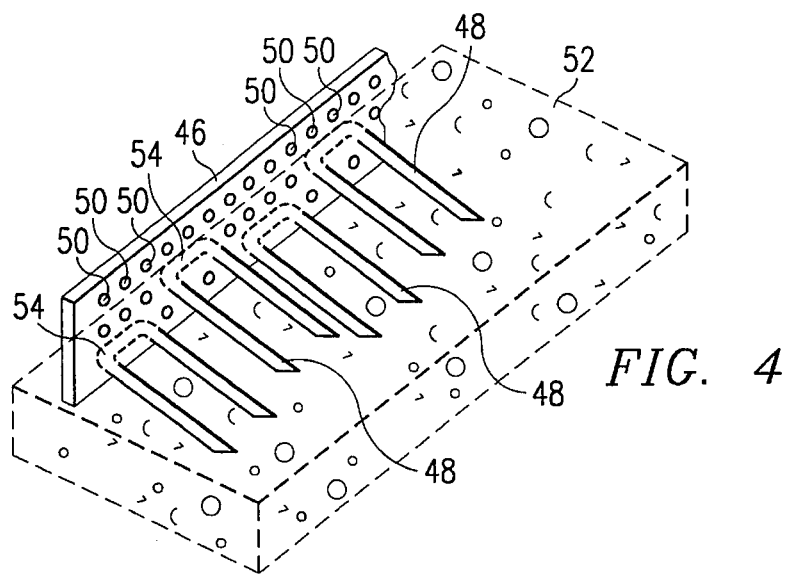
FIG. 4 is an elevation schematically illustrating use of edging strips and fasteners of the present invention with hardscapes.
Figure 5:
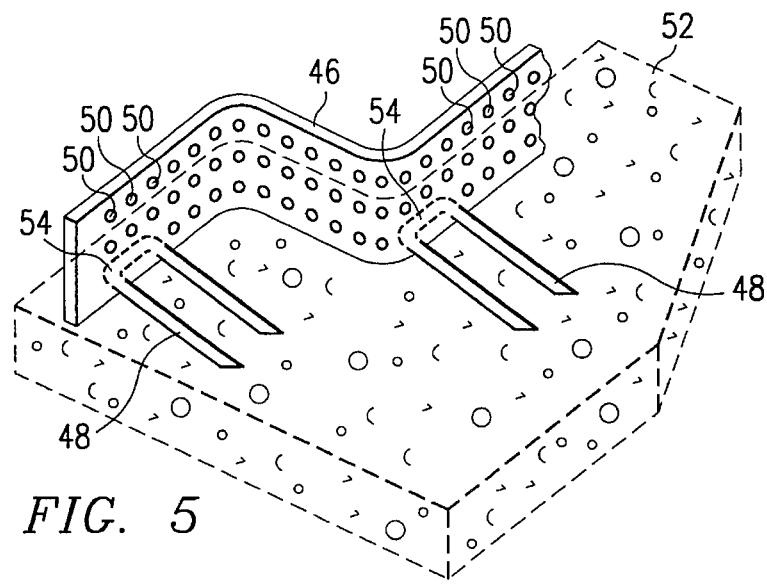
FIG. 5 is an elevation schematically illustrating use of edging strips and fasteners of the present invention with a section of the perimeter of a hardscape that is not straight.
Figure 6:
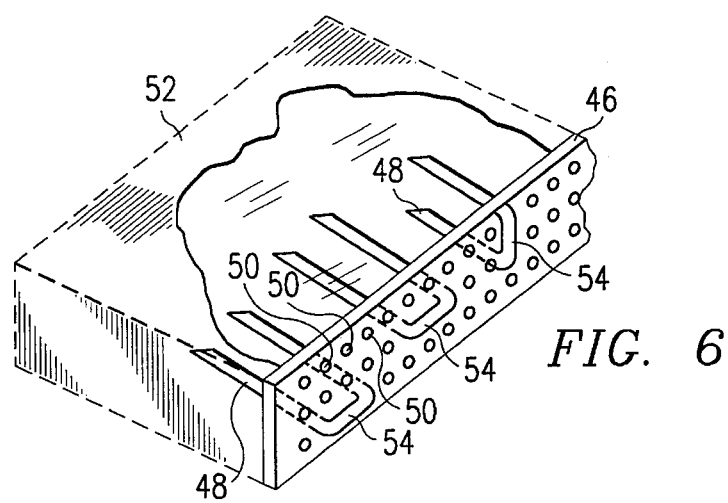
FIG. 6 is an elevation schematically illustrating means by which an edging strip of the present invention is secured through hardscape material.

FIGS. 4, 5, and 6 illustrate use of an edging strip 46 in connection with schematically illustrated hardscape material, such as concrete and the like forming a portion of a driveway, walkway, patio or similar structure. When used in connection with such hardscape structures, the edging strip 46 can be firmly anchored adjacent the perimeter of the structure using U-shaped fasteners 48.

The edging strip 46 includes an array of openings formed as perforations 50. The perforations 50 are aligned longitudinally and transversely, with consistent spacing between the perforations 50, both vertically and horizontally. Consequently, the perforation 50 form a "grid" of regularly spaced openings that facilitate securing the strip 46 to an adjacent area, such as the hardscape shown in FIGS. 4 through 6. Alignment of the perforations 50 transversely between the longitudinal edges of the strip 46 also reduces the resistance of the strip 46 to bending along transverse lines formed by adjacent perforations 50, thereby facilitating bending the strip 46 to conform to the perimeter of the area to which it is secured.

Referring now to FIG. 4, a strip 46 is secured to a hardscape area 52 by means of U-shaped fasteners 48. The strip 46 is positioned adjacent the hardscape 52 to place the uppermost row of perforations 50 above the upper surface of the hardscape 52. The tines of fasteners 48 are spaced equivalent to the horizontal and vertical spacing between the perforations 50, to allow their cross-members 54 to be aligned either horizontally or vertically with respect to the strip 46. Each fastener 48 is then hammered or otherwise driven into the hardscape 52, to firmly secure the strip 46. Location of the upper row of perforations 50 above the hardscape 52 allows drainage of accumulating liquids that would otherwise form puddles or other standing pools that are both unsightly and dangerous if slippery, FIG. 5 illustrates use of the edging strip 46 along a side of a hardscape 52 that is not straight. The strip 46 is bent to conform to the inward and outward corners of the hardscape 52 along bending lines provided by transverse alignment of the perforations 50 across the strip 46. Once conformed to the edge of the hardscape 52, the strip 46 is secured in place by two U-shaped fasteners 48.

FIG. 6 illustrates an alternate use of the edging strip 46 with a hardscape 52 and a variety of positions in which the fasteners 48 may be employed to secure the strip 46. As shown in FIG. 6, the edging strip 46 is positioned with its upper longitudinal edge aligned with the upper surface of the hardscape 52. This placement may be preferable when extension of the strip 46 above the hardscape 52 is not desired.

The grid-like arrangement of the perforations 50 allows the fasteners 48 to be oriented vertically, horizontally and rotationally in a variety of positions. The cross-member 54 of each of the fasteners 48 spans three adjacent perforations 50, in either the vertical or horizontal direction. This allows one of the fasteners to be inserted through the lowest row of perforations 50, with its cross-member 54 aligned horizontally. Another fastener 48 is inserted into the middle row of perforations 50, and is also aligned horizontally. Finally, a third fastener 48 is oriented vertically, with its tines inserted through the uppermost and lowermost row of perforations.

Only preferred embodiments of the invention have been described. It should be understood that the invention is not limited to the embodiments disclosed, but is intended to embrace any alternatives, modifications, rearrangements, or substitutions of parts or elements as fall within the spirit and scope of the invention.

I claim:

1. A method of isolating and allowing drainage of irregularly shaped landscaping, hardscaping and other ground areas, comprising:

identifying at least a portion of the perimeter of at least one upper ground area having a surface level to be substantially horizontally separated from an adjacent lower ground area having a surface level by edging, said surface level of the upper ground area being positioned above said surface level of the lower ground area at the perimeter;

providing a strip of flexible edging material capable of being elastically deformed to conform to the shape of the perimeter of one of the ground areas, the strip having parallel first and second longitudinal edges and an array of openings spaced substantially along its length for allowing drainage of liquids through the edging material, the openings sized and shaped to substantially prevent soil and mulch from passing therethrough, the openings disposed such that a portion of said openings are substantially at or below a centerline located substantially midway between the first and second longitudinal edges of the strip of edging material;

bending and inserting the strip of edging material into the ground in substantial alignment with at least a portion of a border between the lower ground area and the at least one upper ground area; and embedding the strip of edging material into the ground at a depth such that at least a portion of the openings in the material are located at a predetermined position substantially at or below the surface level of the at least one upper ground area such that liquids may drain through the strip of material.

2. A method in accordance with claim 1 wherein at least a portion of the array of openings are aligned laterally at one or more predetermined locations along the length of the strip to form bending lines of reduced resistance.

3. A method in accordance with claim 1 wherein the strip of edging material is provided with openings that are substantially vertical oriented slots.

4. A method in accordance with claim 1 wherein the array of openings of the strip of edging material is provided with a first array of openings located substantially at or above the centerline and a second array of openings located below the centerline.

5. A method in accordance with claim 4 wherein at least some of the first array of openings in the strip of material are positioned below the surface level of the upper ground area and at least some of the second array of openings are positioned substantially at or below the surface level of the lower ground area to allow drainage of liquids through the strip of material.

6. A method in accordance with claim 1 wherein at least some of the openings in the strip of material are positioned below the surface level of the lower ground area to allow sub-surface drainage of liquids through the strip of material.

7. A method in accordance with claim 1 wherein at least some of the openings in the strip of material are positioned substantially at or above the surface level of the lower ground area to allow drainage of liquid through the strip of material.

8. A method in accordance with claim 1 wherein at least some of the openings are positioned above the surface level of the upper ground area and at least some of the openings are positioned below the surface level of the upper ground area to allow drainage of liquid above and below said surface level through the strip of material.

9. A method in accordance with claim 1, further comprising the steps of providing and inserting fastening means through one or more of the strip openings and embedding the fastening means into an adjacent material to secure the strip against movement.

10. A method in accordance with claim 9 wherein the fastening means provided includes a plurality of tines and wherein each tine is inserted through an opening in the strip of material and embedded into the adjacent material.

11. A method in accordance with claim 10 wherein the fastening means inserted into the strip of material is U-shaped.

12. A method in accordance with claim 1 wherein the strip of edging material is embedded at a depth such that the portion of the openings in the material are located at a predetermined position substantially at or below the surface level of the lower ground area such that liquids may drain through the strip of material at a point substantially at or below the surface levels of the upper ground area and the lower ground area.

13. A method of isolating and allowing drainage of irregularly shaped landscaping, hardscaping and other ground areas, comprising:

identifying at least a portion of a perimeter between a first ground area having a desired surface level at the perimeter to be separated by edging from a second ground area having a desired surface level at the perimeter;

providing a strip of flexible edging material having parallel first and second longitudinal edges and a plurality of openings spaced substantially along its length for allowing drainage of liquids through the edging material;

bending and inserting the strip of edging material into the ground in substantial alignment with at least a portion of a border between the first ground area and the second ground area; and embedding the strip of edging material into the ground between the first ground area and the second ground area at a depth thereby placing at least a first portion of the plurality of openings in the strip at a predetermined position below the surface level of the first ground area and at a predetermined position below the surface level of the second ground area such that liquids may drain through the edging material.

14. A method in accordance with claim 13 wherein the plurality of openings are slot-shaped.

15. A method in accordance with claim 13 further comprising the steps of providing and inserting fastening means through one or more of the openings and embedding the fastening means into an adjacent material to secure the strip against movement wherein the fastening means comprises one or more U-shaped pins.

16. A method in accordance with claim 15 further comprising the step of draining liquid from the first ground area to the ground area through one or more of the openings in the strip of edging material.

17. A method in accordance with claim 13 wherein the first portion of the plurality of openings in the strip of edging material is located substantially at or below the centerline of the strip of edging material and a second portion of the plurality of openings is located substantially at or above the centerline with the strip of edging material embedded into the ground at a depth thereby placing the second portion of the openings in the strip at a predetermined position substantially at or below the surface level of the first ground area and substantially at or above the surface level of the second ground area.

18. A method in accordance with claim 17 wherein the first portion of openings is an array of openings is located below the centerline and spaced longitudinally substantially along the length of the strip of edging material and the second portion of openings is an array of openings is located substantially at the centerline and spaced longitudinally substantially along the length of the strip of edging material.

19. A method in accordance with claim 17 wherein the surface level of the first ground area is above the surface level of the second ground area.

20. A method of isolating and allowing drainage of irregularly shaped landscaping, hardscaping and other ground areas, comprising:

identifying at least a portion of the perimeter of at least one upper ground area having a surface level to be separated from an adjacent lower ground area having a surface level by edging, said surface level of the upper ground area being positioned above said surface level of the lower ground area at the perimeter;

providing a strip of flexible edging material capable of being elastically deformed to conform to the shape of the perimeter of one of the ground areas, the strip having parallel first and second longitudinal edges and an array of openings spaced substantially along its length for allowing drainage of liquids through the edging material, the openings disposed such that a portion of said openings are substantially at or below a centerline located substantially midway between the first and second longitudinal edges of the strip of edging material, and wherein the openings are substantially vertical oriented slots;

bending and inserting the strip of edging material into the ground in substantial alignment with at least a portion of a border between two adjacent ground areas; and embedding the strip of edging material into the ground at a depth placing at least a portion of the openings in the material at a predetermined position substantially at or below the surface level of the at least one upper ground areas such that liquids may drain through the strip of material.

* * * * *